US008508957B2

(12) United States Patent
Sato et al.

(10) Patent No.: US 8,508,957 B2
(45) Date of Patent: *Aug. 13, 2013

(54) POWER CONVERSION DEVICE FOR CONVERTING DC POWER TO AC POWER

(75) Inventors: Kazuhide Eduardo Sato, Minato-ku (JP); Masahiro Kinoshita, Minato-ku (JP); Yushin Yamamoto, Minato-ku (JP); Tatsuaki Amboh, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 13/063,862

(22) PCT Filed: Oct. 16, 2008

(86) PCT No.: PCT/JP2008/068772
§ 371 (c)(1),
(2), (4) Date: Mar. 14, 2011

(87) PCT Pub. No.: WO2010/044164
PCT Pub. Date: Apr. 22, 2010

(65) Prior Publication Data
US 2011/0170322 A1 Jul. 14, 2011

(51) Int. Cl.
*H02M 3/335* (2006.01)
*H02H 7/122* (2006.01)
(52) U.S. Cl.
USPC ............ 363/17; 363/16; 363/55; 363/56.02; 363/56.03; 363/56.04; 363/56.05; 363/131; 363/132

(58) Field of Classification Search
USPC ............. 363/16, 17, 55, 56.02, 56.03, 56.04, 363/56.05, 131, 132
See application file for complete search history.

(56) References Cited

U.S. PATENT DOCUMENTS

| 4,783,728 A | 11/1988 | Hoffman |
| 5,790,396 A * | 8/1998 | Miyazaki et al. ............... 363/96 |
| 6,486,647 B1 * | 11/2002 | Obrecht ..................... 324/76.11 |

(Continued)

FOREIGN PATENT DOCUMENTS

| JP | 9-294381 | 11/1997 |
| JP | 2000 166221 | 6/2000 |

(Continued)

OTHER PUBLICATIONS

Japanese Office Action issued May 8, 2012, in Japan Patent Application No. 2010-533763 (with English translation).

(Continued)

*Primary Examiner* — Bao Q Vu
(74) *Attorney, Agent, or Firm* — Oblon, Spivak, McClelland, Maier & Neustadt, L.L.P.

(57) ABSTRACT

A power conversion device includes an inverter for converting DC power to AC power to supply the AC power to a load, a converter for converting AC power from an AC power supply to DC power to supply the DC power to the inverter, a DC voltage converter for converting a voltage value of power stored in a storage battery to supply DC power from the storage battery to the inverter when power supply by the AC power supply is abnormal, and a filter which includes a reactor and a capacitor and removes harmonics generated by the inverter. The inverter includes a three-level circuit constituted of an arm and an AC switch.

18 Claims, 13 Drawing Sheets

(56) References Cited

U.S. PATENT DOCUMENTS

| | | | |
|---|---|---|---|
| 7,292,462 B2 | 11/2007 | Watanabe et al. | |
| 8,115,444 B2 * | 2/2012 | De et al. | 318/801 |
| 8,208,276 B2 * | 6/2012 | Sato et al. | 363/131 |
| 2004/0136210 A1 * | 7/2004 | Oh | 363/37 |
| 2006/0215425 A1 * | 9/2006 | Fu et al. | 363/37 |
| 2008/0278976 A1 * | 11/2008 | Schneider et al. | 363/37 |
| 2009/0086515 A1 * | 4/2009 | Sakakibara | 363/37 |
| 2010/0110742 A1 * | 5/2010 | West | 363/132 |

FOREIGN PATENT DOCUMENTS

| | | |
|---|---|---|
| JP | 2000 350465 | 12/2000 |
| JP | 2003 52134 | 2/2003 |
| JP | 2006 109603 | 4/2006 |
| JP | 2006 296098 | 10/2006 |
| JP | 2007 28860 | 2/2007 |

OTHER PUBLICATIONS

U.S. Appl. No. 13/498,009, filed Mar. 23, 2012, Sato, et al.
U.S. Appl. No. 13/498,515, filed Mar. 27, 2012, Sato, et al.
International Search Report issued Dec. 9, 2008 in PCT/JP08/68772 filed Oct. 16, 2008.
Korean Office Action issued on May 31, 2012, in patent Application No. 10-2011-7006543 with English Translation.

* cited by examiner

| Vu | Vv | Vu-Vv |
|---|---|---|
| E/2 | E/2 | 0 |
| E/2 | -E/2 | E |
| -E/2 | E/2 | -E |
| -E/2 | -E/2 | 0 |

| Vu | Vv | Vu-Vv |
|---|---|---|
| E/2 | E/2 | 0 |
| E/2 | 0 | E/2 |
| E/2 | -E/2 | E |
| 0 | E/2 | -E/2 |
| 0 | 0 | 0 |
| 0 | -E/2 | E/2 |
| -E/2 | E/2 | -E |
| -E/2 | 0 | -E/2 |
| -E/2 | -E/2 | 0 |

| | TWO-LEVEL | THREE-LEVEL | RATIO TO TWO-LEVEL |
|---|---|---|---|
| STEADY LOSS (W) | 417 | 456 | 110% |
| SWITCHING LOSS (W) | 723 | 313 | 43% |
| TOTAL (W) | 1140 | 770 | 68% |

| Q1D | Q2D | Q3D | Q4D | VOLTAGE APPLIED TO REACTOR |
|---|---|---|---|---|
| OFF | ON | ON | OFF | -VB |
| ON | OFF | OFF | ON | E-VB |
| ON | OFF | ON | OFF | E/2-VB |
| OFF | ON | OFF | ON | E/2-VB |

(a)

(b)

(c)

POWER CONVERSION DEVICE FOR CONVERTING DC POWER TO AC POWER

TECHNICAL FIELD

The present invention relates to a power conversion device outputting AC power based on DC power, such as an uninterruptible power supply device, a solar power generation system, a fuel cell power generation system, or a secondary battery energy storage system.

BACKGROUND ART

An uninterruptible power supply device has widely been used as a power supply device for supplying AC power to an important load such as a computer system in a stable manner. For example, as disclosed in Japanese Patent Laying-Open No. 2006-109603 (Patent Document 1), an uninterruptible power supply device generally includes a converter for converting AC power to DC power, an inverter for converting DC power to AC power, and a filter for removing harmonics generated by the operation of the inverter. Usually, the converter converts AC power from a commercial AC power supply to DC power, and supplies the DC power to the inverter while charging a power storage device such as a storage battery. The inverter converts DC power to AC power and supplies the AC power to the load. When the commercial AC power supply fails, power from the power storage device such as a storage battery is supplied to the inverter, which continues to supply AC power to the load.

Patent Document 1: Japanese Patent Laying-Open No. 2006-109603

DISCLOSURE OF THE INVENTION

Problems to be Solved by the Invention

The above-described filter includes a reactor and a capacitor. When harmonics are large, for example, it is necessary to use a reactor having a large inductance. In order to increase the inductance of the reactor, for example, the number of turns of a coil may be increased, however, the volume and weight of the reactance will be increased. This gives rise to a problem that an increased inductance of the reactor results in an increased volume and weight of an uninterruptible power supply device. Japanese Patent Laying-Open No. 2006-109603, however, does not disclose any specific solution to the above-described problem of an increase in size of an uninterruptible power supply device.

An object of the present invention is to provide a power conversion device which has a configuration suitable for downsizing and weight reduction.

Means for Solving the Problems

In summary, the present invention is a power conversion device which includes a converter, a filter, a DC power supply, DC positive and DC negative buses, and first and second capacitors. The converter includes a multi-level circuit configured to be capable of conversion between a DC voltage and an AC voltage varying between at least three voltage values, and converts DC power to AC power to supply the AC power to a load. The filter includes a reactor and a capacitor and removes harmonics generated by the converter. The DC power supply generates DC power. The DC positive and DC negative buses transmit the DC power to the converter. The first and second capacitors are connected in series between the DC positive bus and the DC negative bus. The multi-level circuit includes first and second semiconductor switching elements, first and second free-wheeling diodes, and an AC switch circuit. The first and second semiconductor switching elements are connected in series between the DC positive bus and the DC negative bus. The first and second free-wheeling diodes are connected in anti-parallel to the first and second semiconductor switching elements, respectively. The AC switch is connected between a neutral point of the first and second capacitors and a connection point of the first and second semiconductor switching elements.

Effects of the Invention

According to the present invention, downsizing and weight reduction of a power conversion device can be realized.

Figure 1:
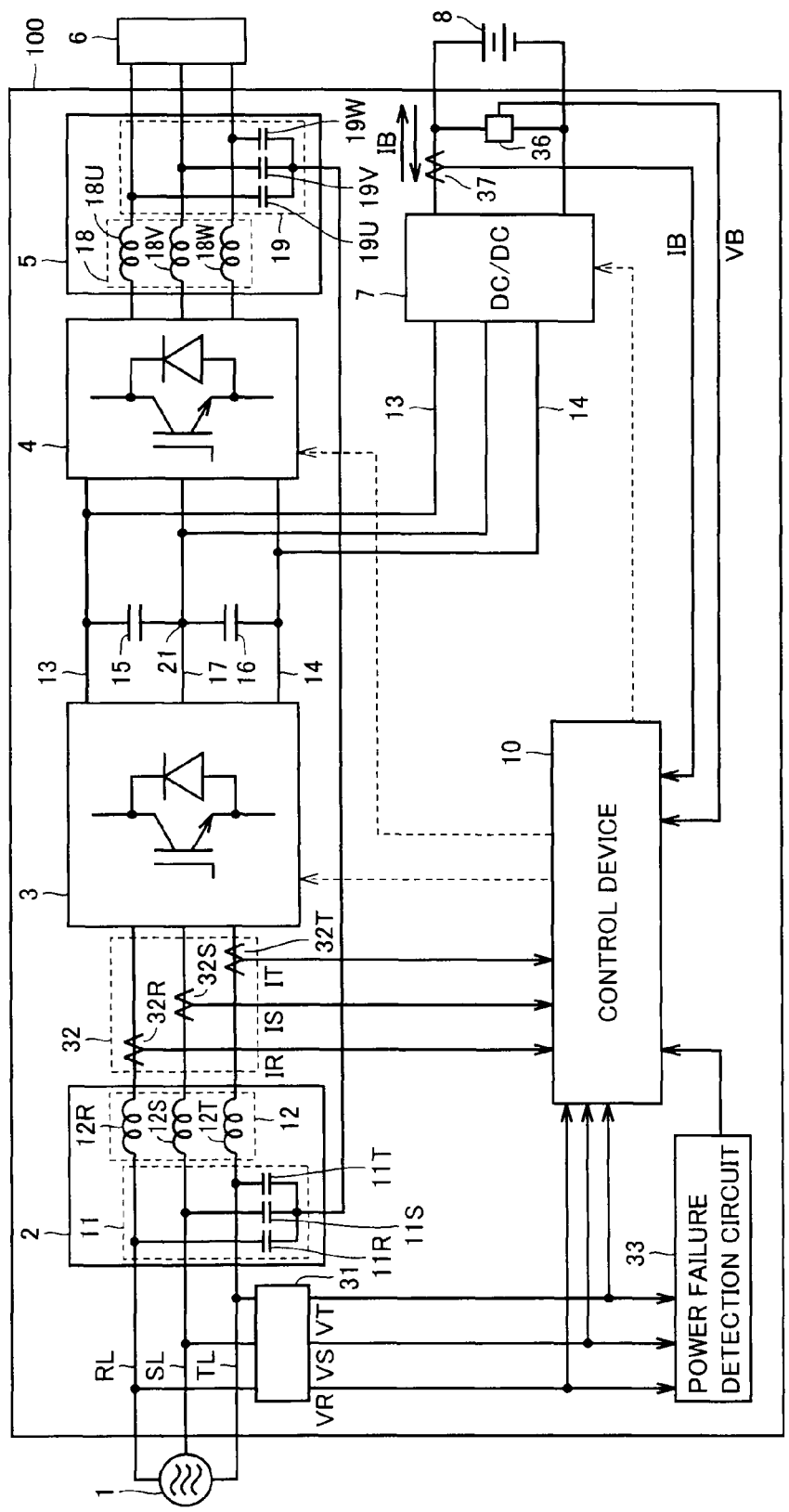
FIG. 1 is a schematic block diagram showing a main circuit configuration of an uninterruptible power supply device 100 according to one embodiment of the present invention.

DESCRIPTION OF THE REFERENCE SIGNS 1 commercial AC power supply; 2 input filter; 3 converter; 3RA R-phase arm; 3RB R-phase AC switch; 3SA S-phase arm; 3SB S-phase AC switch; 3TA T-phase arm; 3TB T-phase AC switch; 4, 41 inverter; 4UA, 41U U-phase arm; 4UB U-phase AC switch; 4VA, 41V V-phase arm; 4VB V-phase AC switch, 4WA W-phase arm; 4WB W-phase AC switch; 5 output filter; 6 load; 7 DC voltage converter; 8 storage battery; 10 control device; 11, 11R, 11S, 11T, 15, 16, 19, 19U, 19V, 19W capacitor; 12, 12R, 12S, 12T, 18, 18U, 18V, 18W reactor; 13, 42 DC positive bus; 14, 43 DC negative bus; 17 DC neutral point bus; 21, O neutral point; 22, 22N, 22P, 45 reactor; 23, 44 semiconductor switch; 31, 36 voltage sensor; 32, 37 current sensor; 33 power failure detection circuit; 100 uninterruptible power supply device; CA, CB, CC, CD capacitor; D1D to D4D, D1R to D4R, D1S to D4S, D1T to D4T, D1U to D4U, D1V to D4V, D1W to D4W, D3$x$, D4$x$, DA, DB, DC, DD diode; Q1D to Q4D, Q1R to Q4R, Q1S to Q4S, Q1T to Q4T, Q1U to Q4U, Q1V to Q4V, Q1W to Q4W, Q3$x$ to Q5$x$, QA, QB, QC, QD IGBT element; RL R-phase line; SL S-phase line; TL T-phase line; UL U-phase line; VL V-phase line; and WL W-phase line.

BEST MODES FOR CARRYING OUT THE INVENTION

An embodiment of the present invention will be described in detail hereinafter with reference to the drawings. It is noted that in the drawings, the same or corresponding elements have the same reference signs allotted, and description thereof will not be repeated.

FIG. 1 is a schematic block diagram showing a main circuit configuration of an uninterruptible power supply device 100 according to one embodiment of the present invention. Referring to FIG. 1, uninterruptible power supply device 100 includes an input filter 2, a converter 3, an inverter 4, an output filter 5, a DC voltage converter (denoted as "DC/DC" in the drawing) 7, a control device 10, a DC positive bus 13, a DC negative bus 14, capacitors 15, 16, a DC neutral point bus 17, voltage sensors 31, 36, current sensors 32, 37, a power failure detection circuit 33, an R-phase line RL, an S-phase line SL, and a T-phase line TL.

Input filter 2 prevents leakage of harmonics to a commercial AC power supply 1. Commercial AC power supply 1 is a three-phase AC power supply. Input filter 2 is a three-phase LC filter circuit constituted of a capacitor 11 (capacitors 11R, 11S, 11T) and a reactor 12 (reactors 12R, 12S, 12T).

Converter 3 converts three-phase AC power supplied from commercial AC power supply 1 via input filter 2 into DC power and supplies the DC power to inverter 4 via DC positive bus 13 and DC negative bus 14. Inverter 4 converts the DC power from converter 3 into three-phase AC power. As will be described later, converter 3 and inverter 4 are each constituted of a three-level circuit. Converter 3 and inverter 4 are connected to each other via DC positive bus 13, DC negative bus 14, and DC neutral point bus 17.

Capacitors 15, 16 are connected in series between DC positive bus 13 and DC negative bus 14 and smooth voltage across DC positive bus 13 and DC negative bus 14. A connection point of capacitors 15, 16 is a neutral point 21, to which DC neutral point bus 17 is connected.

The AC power from inverter 4 is supplied to a load 6 via output filter 5. Output filter 5 removes harmonics generated by the operation of inverter 4. Output filter 5 is a three-phase LC filter circuit constituted of a reactor 18 (reactors 18U, 18V, 18W) and a capacitor 19 (capacitors 19U, 19V, 19W).

DC voltage converter 7 carries out conversion between a DC voltage across DC positive bus 13 and DC negative bus 14 and a voltage of a storage battery 8. It is noted that it is only necessary that a power storage device that can be charged and can discharge is connected to DC voltage converter 7, and for example, an electric double layer capacitor may be connected to DC voltage converter 7. In addition, though storage battery 8 is installed outside uninterruptible power supply device 100 in the present embodiment, storage battery 8 may be contained in uninterruptible power supply device 100.

Voltage sensor 31 detects a voltage VR of the R-phase line, a voltage VS of the S-phase line, and a voltage VT of the T-phase line, and outputs three-phase voltage signals indicating respective voltages VR, VS and VT to control device 10 and power failure detection circuit 33. Current sensor 32 detects current IR of the R-phase line, current IS of the S-phase line, and current IT of the T-phase line and outputs three-phase current signals indicating respective currents IR, IS and IT to control device 10.

Power failure detection circuit 33 detects power failure of commercial AC power supply 1 based on the three-phase voltage signal from voltage sensor 31. Power failure detection circuit 33 outputs a power failure signal indicating power failure of commercial AC power supply 1 to control device 10. Voltage sensor 36 detects a voltage VB across positive and negative electrodes of storage battery 8 and outputs a signal indicating voltage VB to control device 10. Current sensor 37 detects a current IB inputted to and outputted from storage battery 8 and outputs a signal indicating current IB to control device 10.

Control device 10 controls operations of converter 3, inverter 4 and DC voltage converter 7. Though detailed description will be provided later, converter 3, inverter 4 and DC voltage converter 7 are each constituted of a semiconductor switch including a semiconductor switching element. It is noted that in the present embodiment, an IGBT (Insulated Gate Bipolar Transistor) is employed as the semiconductor switching element. In addition, in the present embodiment, PWM (Pulse Width Modulation) control can be adopted as a method for controlling the semiconductor switching element. Control device 10 carries out PWM control, upon receiving the three-phase voltage signals from voltage sensor 31, the three-phase current signals from current sensor 32, the power failure signal from power failure detection circuit 33, the signal indicating voltage VB detected by voltage sensor 36, the signal indicating current IB detected by current sensor 37, and the like.

An operation of uninterruptible power supply device 100 according to the present embodiment will now be described. When commercial AC power supply 1 can normally supply AC power, converter 3 converts AC power from commercial AC power supply 1 into DC power and inverter 4 converts the DC power into AC power and supplies the AC power to load 6. DC voltage converter 7 converts the DC voltage from converter 3 into a voltage suitable for charging storage battery 8, so that storage battery 8 is charged. On the other hand, when the commercial AC power supply fails, control device 10 stops converter 3 based on the power failure signal from power failure detection circuit 33. In addition, control device 10 operates DC voltage converter 7 such that DC power is supplied from storage battery 8 to inverter 4, thus causing inverter 4 to continue supply of AC power. In this case, DC voltage converter 7 converts the voltage of storage battery 8 into a voltage suitable as an input voltage for inverter 4. Thus, AC power can be supplied to an AC load in a stable manner.

Figure 2:
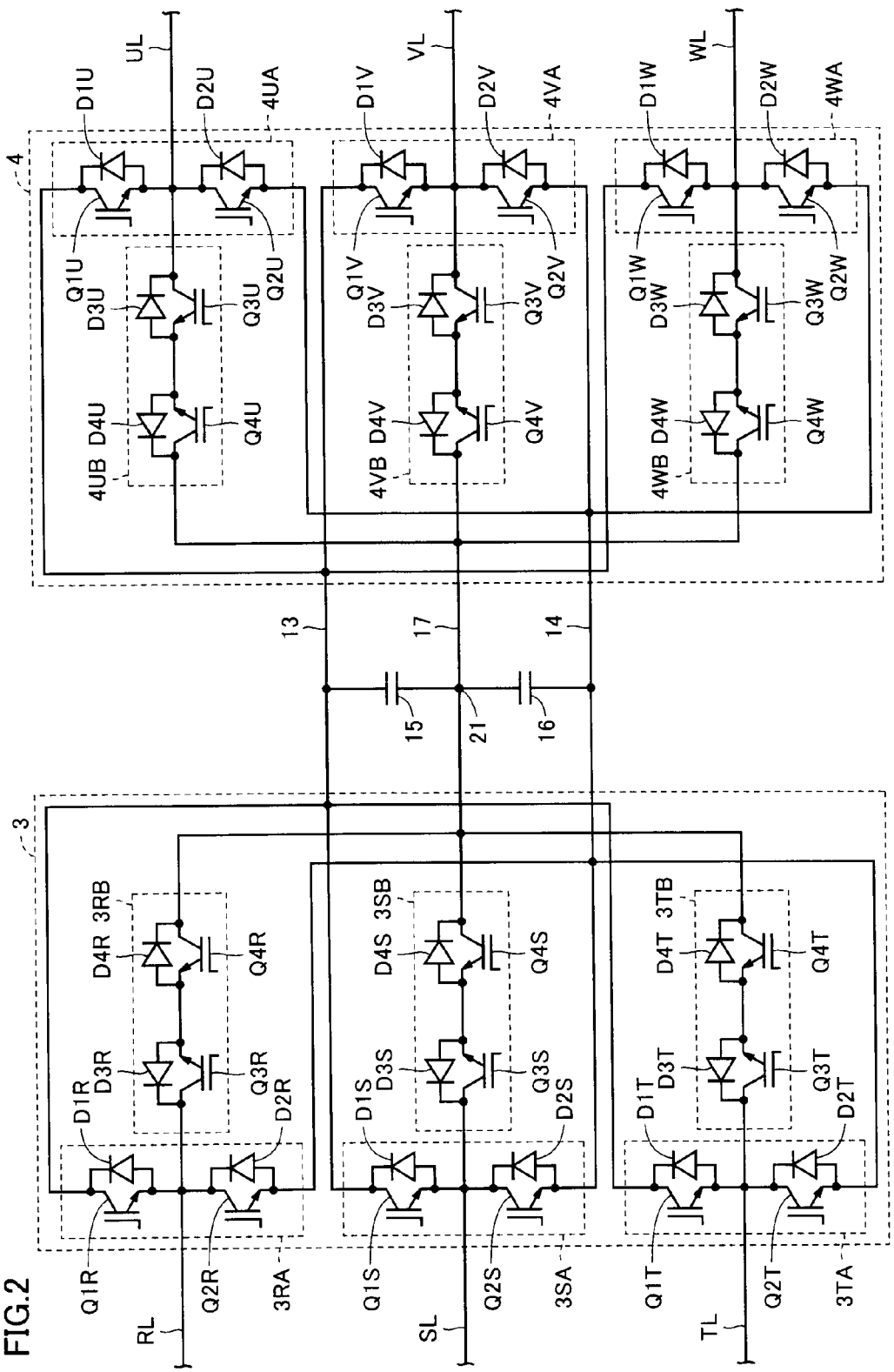
FIG. 2 is a circuit diagram illustrating in detail a configuration of a converter 3 and an inverter 4 shown in FIG. 1.

FIG. 2 is a circuit diagram illustrating in detail a configuration of converter 3 and inverter 4 shown in FIG. 1. Referring to FIG. 2, converter 3 includes an R-phase arm 3RA, an R-phase AC switch 3RB, an S-phase arm 3SA, an S-phase AC switch 3SB, a T-phase arm 3TA, and a T-phase AC switch 3TB. Inverter 4 includes a U-phase arm 4UA, a U-phase AC switch 4UB, a V-phase arm 4VA, a V-phase AC switch 4VB, a W-phase arm 4WA, and a W-phase AC switch 4WB.

Each phase of converter 3 has the arm (3RA, 3SA, 3TA) and the AC switch (3RB, 3SB, 3TB) that are configured as a three-level circuit, which includes four IGBT elements and four diodes. Each phase of inverter 4 has the arm (3UA, 3VA, 3WA) and the AC switch (3UB, 3VB, 3WB) that are configured as a three-level circuit, which includes four IGBT elements and four diodes.

Specifically, R-phase arm 3RA includes IGBT elements Q1R, Q2R and diodes D1R, D2R. R-phase AC switch 3RB includes IGBT elements Q3R, Q4R and diodes D3R, D4R. S-phase arm 3SA includes IGBT elements Q1S, Q2S and diodes D1S, D2S. S-phase AC switch 3RB includes IGBT elements Q3S, Q4S and diodes D3S, D4S. T-phase arm 3TA includes IGBT elements Q1T, Q2T and diodes D1T, D2T. T-phase AC switch 3TB includes IGBT elements Q3T, Q4T and diodes D3T, D4T.

U-phase arm 4UA includes IGBT elements Q1U, Q2U and diodes D1U, D2U. U-phase AC switch 4UB includes IGBT elements Q3U, Q4U and diodes D3U, D4U. V-phase arm 4VA includes IGBT elements Q1V, Q2V and diodes D1V, D2V. V-phase AC switch 4VB includes IGBT elements Q3V, Q4V and diodes D3V, D4V. W-phase arm 4WA includes IGBT elements Q1W, Q2W and diodes D1W, D2W. W-phase AC switch 4WB includes IGBT elements Q3W, Q4W and diodes D3W, D4W.

Hereinafter, in order to collectively describe the arm and the AC switch of each phase of converter 3 and the arm and the AC switch of each phase of inverter 4, reference characters R, S, T, U, V, and W are collectively denoted as a reference character "x". IGBT elements Q1$x$, Q2$x$ are connected in series between DC positive bus 13 and DC negative bus 14. IGBT element Q3$x$ has a collector connected to a connection point of IGBT elements Q1$x$, Q2$x$, IGBT element Q3$x$ has an emitter connected to an emitter of IGBT element Q4$x$, and IGBT element Q4$x$ has a collector connected to neutral point 21. Diodes D3$x$, D4$x$ are connected in anti-parallel to IGBT elements Q3$x$, Q4$x$, respectively. Diodes D1$x$, D2$x$ function as free-wheeling diodes, and diodes D3$x$ and D4$x$ function as clamp diodes.

In the arm (3RA, 3SA, 3TA) and the AC switch (3RB, 3SB, 3TB) of each phase of converter 3, the connection point of IGBT elements Q1$x$, Q2$x$ corresponds to an AC input terminal, and the collector of IGBT element Q4$x$ corresponds to a DC output terminal. In contrast, in the arm (4UA, 4VA, 4TA) and the AC switch (3UB, 3VB, 3WB) of each phase of inverter 4, the collector of IGBT element Q4$x$ corresponds to a DC input terminal, and the connection point of IGBT elements Q1$x$, Q2$x$ corresponds to an AC output terminal. The AC input terminal of each phase of converter 3 is connected to a corresponding line (R-phase line RL, S-phase line SL, T-phase line TL), and the AC output terminal of each phase of inverter 4 is connected to a corresponding line (a U-phase line UL, a V-phase line VL, a W-phase line WL). The DC output terminal of each phase of converter 3 and the DC input terminal of each phase of inverter 4 are connected to neutral point 21.

Figure 3:
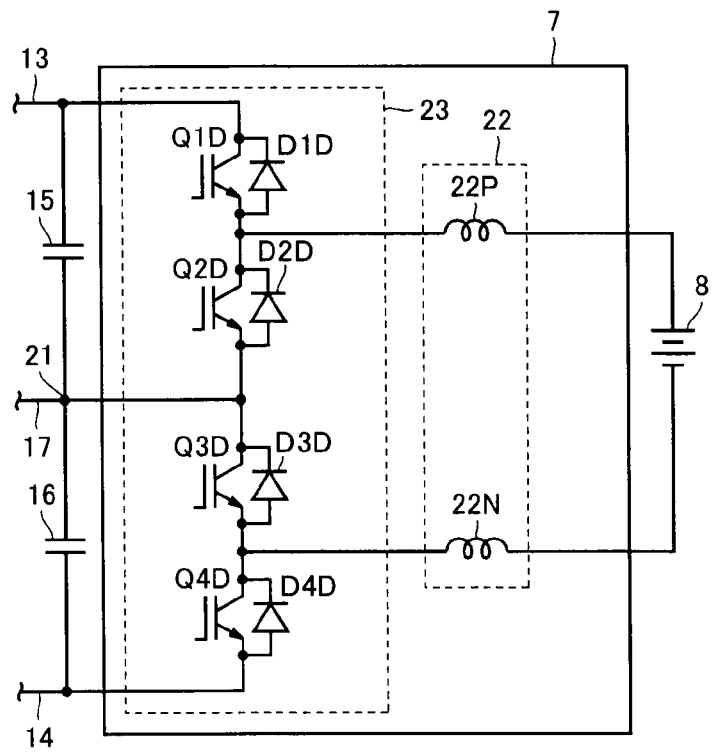
FIG. 3 illustrates in detail a configuration of a DC voltage converter 7 shown in FIG. 1.

FIG. 3 illustrates in detail a configuration of DC voltage converter 7 shown in FIG. 1. Referring to FIG. 3, DC voltage converter 7 includes a reactor 22 and a semiconductor switch 23. Semiconductor switch 23 includes IGBT elements Q1D to Q4D connected in series between DC positive bus 13 and DC negative bus 14 and diodes D1D to D4D connected in anti-parallel to IGBT elements Q1D to Q4D, respectively.

In semiconductor switch 23, to a connection point of IGBT elements Q1D, Q2D, one end of a reactor 22P is connected, and to a connection point of IGBT elements Q3D, Q4D, one end of a reactor 22N is connected. Reactor 22P has the other end connected to the positive terminal of storage battery 8, and reactor 22N has the other end connected to the negative terminal of storage battery 8.

As described above, in uninterruptible power supply device 100 according to the present embodiment, converter 3 and inverter 4 are each constituted of a three-level circuit. In a conventional power conversion device, generally, an inverter is constituted of a two-level circuit for the purpose of reducing the number of semiconductor switching elements, and the like. In an inverter constituted of a three-level circuit, more suppression of harmonics can be achieved than that in the conventional power conversion device.

Figure 4:
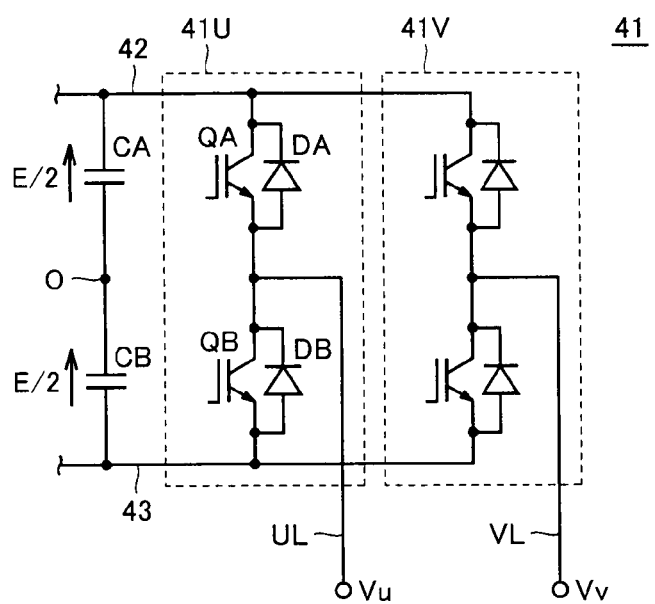
FIG. 4 shows a single-phase inverter constituted of a two-level circuit.

FIG. 4 shows a single-phase inverter constituted of a two-level circuit. Referring to FIG. 4, an inverter 41 includes a U-phase arm 41U and a V-phase arm 41V. U-phase arm 41U and V-phase arm 41V are connected in parallel between a DC positive bus 42 and a DC negative bus 43 and have identical configurations to each other. U-phase arm 41U includes IGBT elements QA, QB connected in series between DC positive bus 42 and DC negative bus 43 and diodes DA, DB connected in anti-parallel to IGBT elements QA, QB, respectively. To a connection point of IGBT elements QA, QB, U-phase line UL is connected. V-phase arm 41V has a configuration in which U-phase line UL in the above-described configuration of U-phase arm 41U is replaced with V-phase line VL.

Between DC positive bus 42 and DC negative bus 43, capacitors CA, CB are connected in series. A neutral point O is a connection point of capacitors CA, CB. A voltage across capacitor CA and a voltage across capacitor CB are both E/2 (E is a predetermined value).

Figures 5, 6:
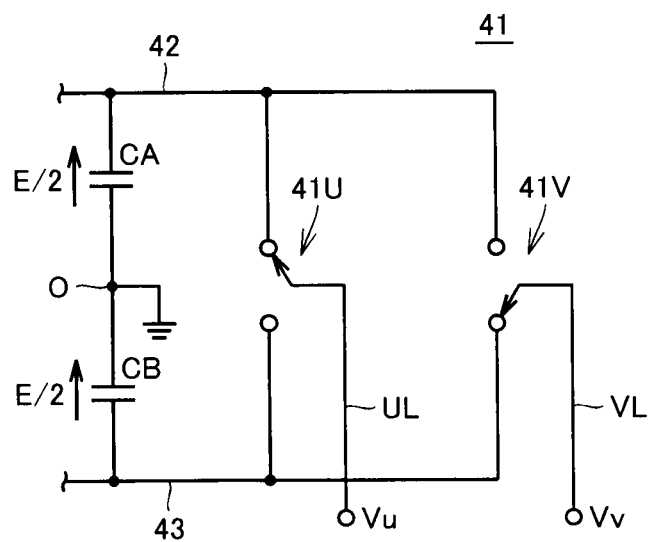
FIG. 5 is an equivalent circuit of an inverter 41 shown in FIG. 4.
FIG. 6 shows line voltages of inverter 41.

FIG. 5 is an equivalent circuit of inverter 41 shown in FIG. 4. Referring to FIG. 5, U-phase arm 41U is equivalent to a switch for switching whether U-phase line UL is to be connected to DC positive bus 42 or to DC negative bus 43. Considering neutral point O as being grounded, U-phase line UL has a voltage Vu which switches between E/2 and −E2 upon operation of the switch. V-phase line VL has a voltage Vv which varies in the same manner as voltage Vu. In this way, a two-level circuit converts a DC voltage E to an AC voltage having two values (E/2, −E/2).

FIG. 6 shows line voltages of inverter 41. Referring to FIG. 6, the line voltage (difference between voltage Vu and voltage Vv) switches between E, 0 and −E. In an inverter constituted of a two-level circuit (two-level inverter), the minimum variation range of a line voltage is equal to voltage E.

Figures 7, 8:
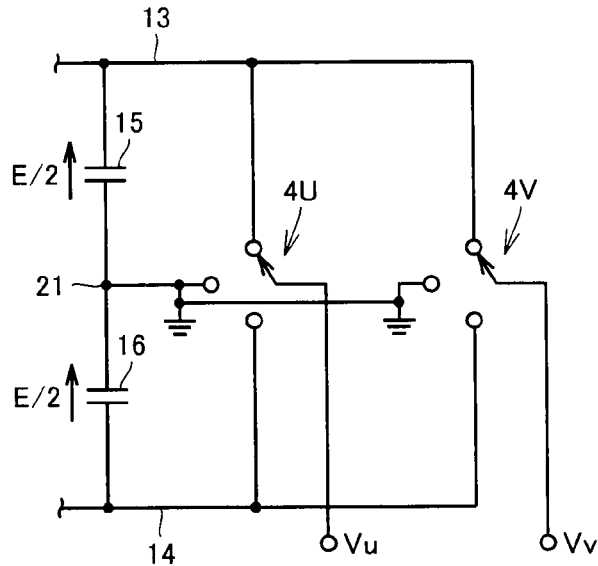
FIG. 7 is an equivalent circuit diagram of a U-phase arm and a U-phase AC switch (4U) as well as a V-phase arm and a V-phase AC switch (4V) of inverter 4 shown in FIG. 2.
FIG. 8 shows line voltages of a single-phase three-level inverter shown in FIG. 7.

FIG. 7 is an equivalent circuit diagram of the U-phase arm and the U-phase AC switch (4U) as well as the V-phase arm and the V-phase AC switch (4V) of inverter 4 shown in FIG. 2. Referring to FIG. 7, the U-phase arm and the U-phase AC switch (4U) are equivalent to a switch for switching whether U-phase line UL is to be connected to DC positive bus 13 or to neutral point 21 or to DC negative bus 14. Operation of this switch causes voltage Vu of U-phase line UL to switch between E/2, 0 and −E/2. V-phase line VL has voltage Vv which varies in the same manner as voltage Vu. In this way, a three-level circuit is a circuit capable of conversion between a DC voltage and an AC voltage having three values.

FIG. 8 shows line voltages of a single-phase three-level inverter shown in FIG. 7. Referring to FIG. 7, the line voltage (difference between voltage Vu and voltage Vv) switches between E, E/2, 0, −E/2 and −E. In an inverter constituted of a three-level circuit (three-level inverter), the minimum variation range of a line voltage is equal to E/2.

It can be seen from FIGS. 6 and 8 that a three-level inverter has a smaller variation range of a line voltage than that of a two-level inverter. The smaller the variation range of a line voltage is, the more minutely varying waveform an output voltage of an inverter has, so that the waveform closer to a sinusoidal wave can be obtained. A voltage waveform closer to a sinusoidal wave allows for smaller harmonics generated by the operation of the inverter. Therefore, in a three-level inverter, more reduction in harmonics can be achieved than that in a two-level inverter.

Figure 9:
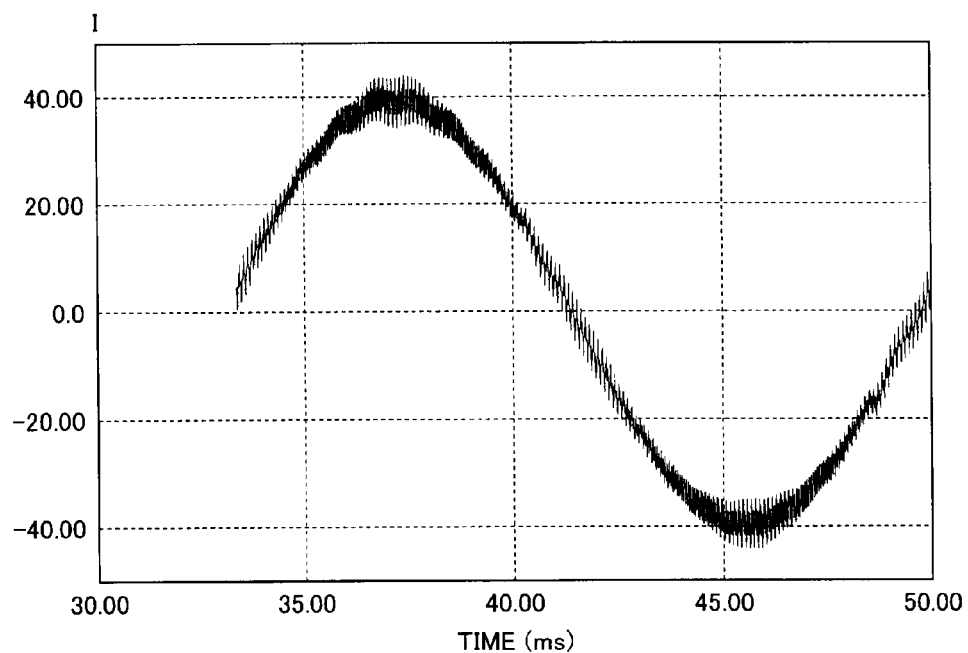
FIG. 9 shows the result of simulating reactor current when a filter reactor provided on the output side of a two-level inverter is set to be 5% and the inverter is switched at a frequency of 10 kHz.
Figure 10:
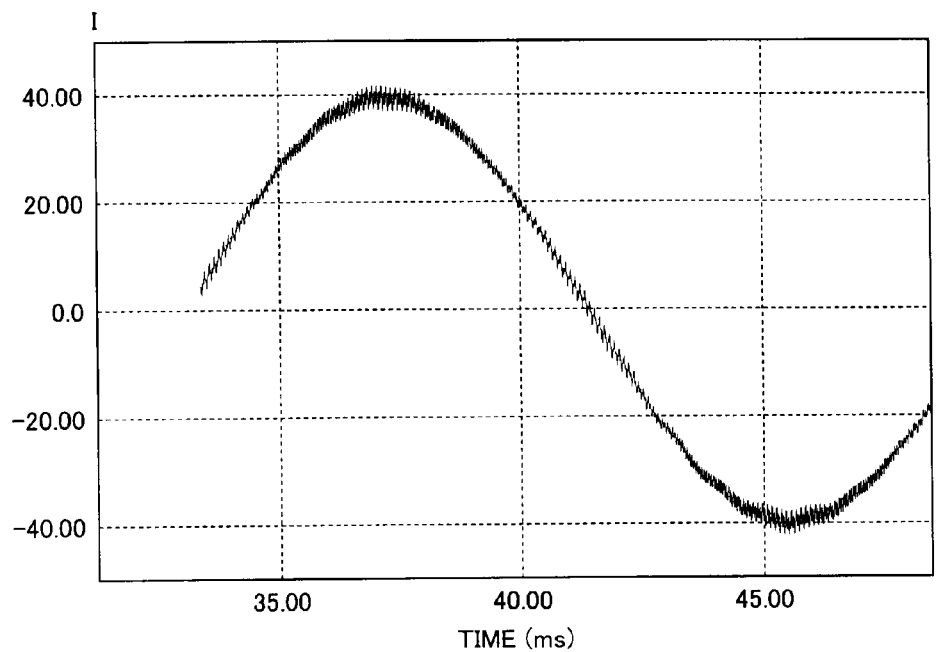
FIG. 10 shows the result of simulating reactor current when a filter reactor provided on the output side of a two-level inverter is set to be 10% and the inverter is switched at a frequency of 10 kHz.

FIG. 9 shows the result of simulating reactor current when a filter reactor provided on the output side of a two-level inverter is set to be 5% and the inverter is switched at a frequency of 10 kHz. FIG. 10 shows the result of simulating reactor current when a filter reactor provided on the output side of a two-level inverter is set to be 10% and the inverter is switched at a frequency of 10 kHz. Comparing total harmonic distortions (THDs) according to simulations in FIGS. 9 and 10, while the THD was 6.4% when a reactor inductance was 5%, increasing reactor inductance to 10% resulted in a decreased THD of 3.2%.

THD represents the ratio of the sum of the effective values of harmonic components to the effective value of a fundamental wave. A smaller THD means smaller harmonic components. FIGS. 9 and 10 show that increasing reactor inductance results in a smaller THD. Once a reactor inductance is increased in order to obtain smaller harmonic components, however, it is necessary, for example, to increase the number of turns of a coil, which gives rise to a problem of an increased volume and weight of the reactor.

Figure 11:
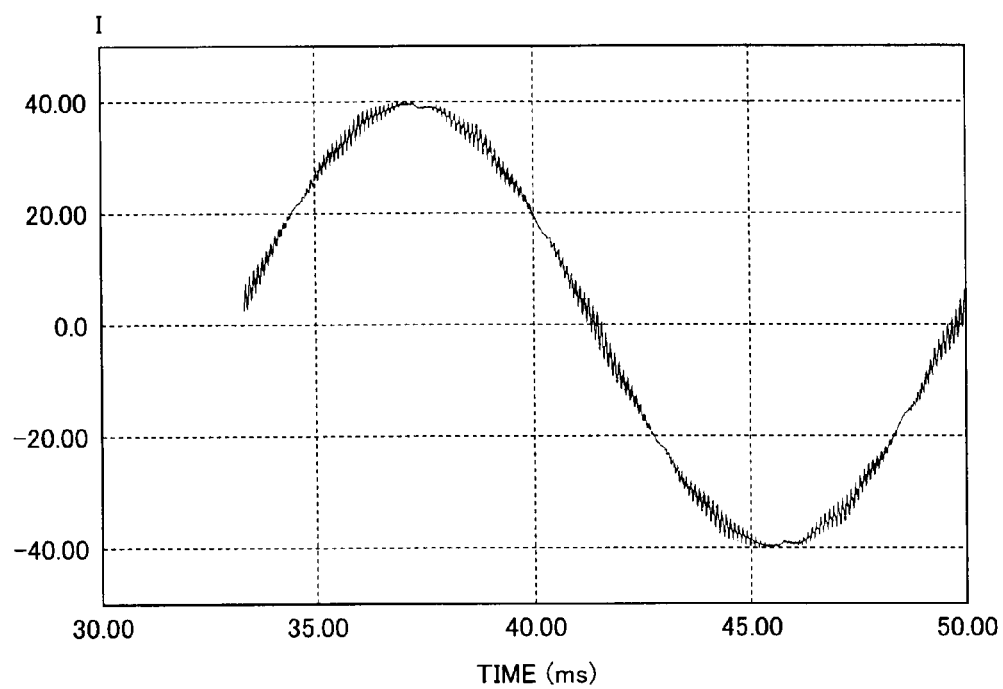
FIG. 11 shows the result of simulating reactor current when a filter reactor provided on the output side of a three-level inverter is set to be 5% and the inverter is switched at a frequency of 10 kHz.

FIG. 11 shows the result of simulating reactor current when a filter reactor provided on the output side of a three-level inverter is set to be 5% and the inverter is switched at a frequency of 10 kHz. Referring to FIG. 11 and FIG. 9, it can be seen that if filter reactors have the same inductance, in a three-level inverter, more suppression of harmonic components can be achieved than that in a two-level inverter. In the simulation result shown in FIG. 11, the THD was 3.2%.

Figure 12:
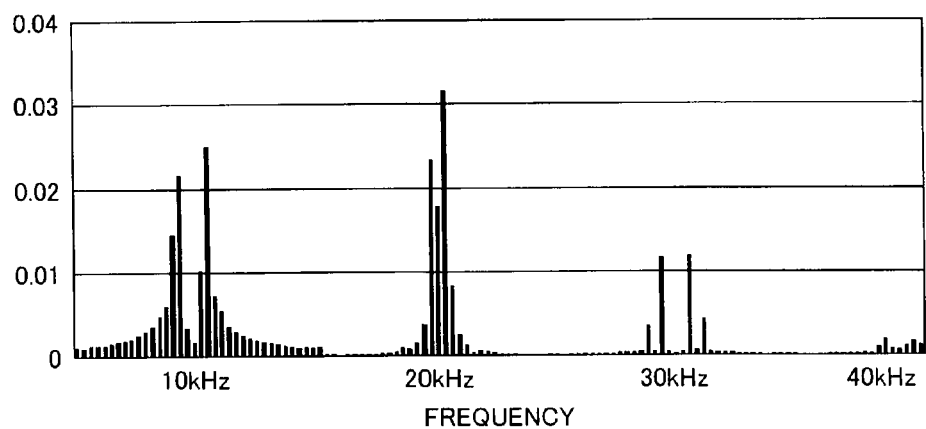
FIG. 12 shows a frequency spectrum of harmonic current produced by the two-level inverter (FIG. 9).
Figure 13:
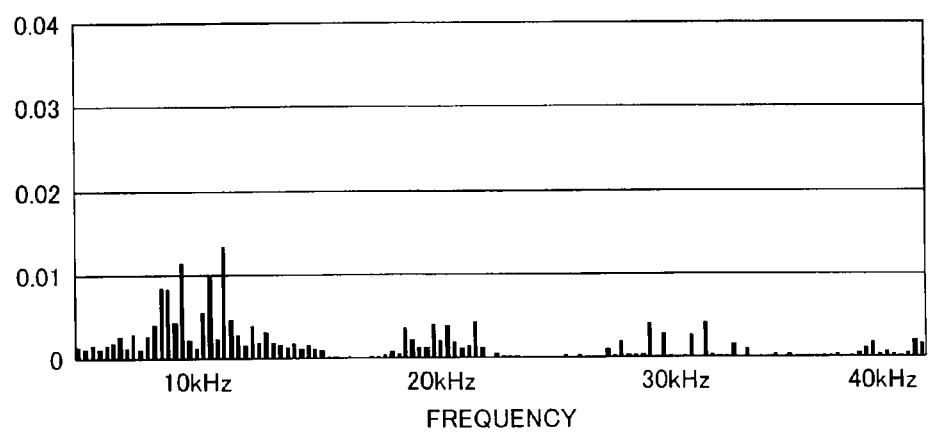
FIG. 13 shows a frequency spectrum of harmonic current produced by the three-level inverter (FIG. 11).

FIG. 12 shows a frequency spectrum of harmonic current produced by the two-level inverter (FIG. 9). FIG. 13 shows a frequency spectrum of harmonic current produced by the three-level inverter (FIG. 11). Referring to FIGS. 12 and 13, it can be seen that irrespective of frequency, in a three-level inverter, more suppression of harmonics can be achieved than that in a two-level inverter. It is noted that the frequency spectra of FIGS. 12 and 13 were obtained through simulations. In the simulations, a DC voltage inputted to the inverters was 500 V, a load was a three-phase resistance voltage of 10 kW, and an output voltage (line voltage) was 208 Vrms.

In this way, according to the present embodiment, in an inverter constituted of a three-level circuit, reduction in harmonics generated by the inverter can be achieved. This allows for use of a reactor having a small inductance for a filter, and the volume and weight of the reactor can thereby be reduced. Therefore, according to the present embodiment, downsizing and weight reduction of a power conversion device can be realized.

Additionally, in the present embodiment, an inverter constituted of a three-level circuit provides the following effects.

In a power conversion device, a storage battery and the like having a large capacity is connected, as a DC power supply, to an input-side DC capacitor of an inverter. During the operation of the inverter, when a fluctuation in a potential to ground becomes larger, a large stray capacitance of a DC circuit causes the amount of generated noise to become larger. If inverter 4 were constituted of a two-level inverter, the inverter would have a larger variation range of output voltage, and therefore would have a larger fluctuation in a potential to ground. In the present embodiment, however, inverter 4 is constituted of a three-level inverter, thereby achieving a smaller variation range of its output voltage as compared with in the case of a two-level inverter. Since a smaller fluctuation in a potential to ground can thereby be achieved, reduction in the amount of generated noise can be achieved.

Figure 14:
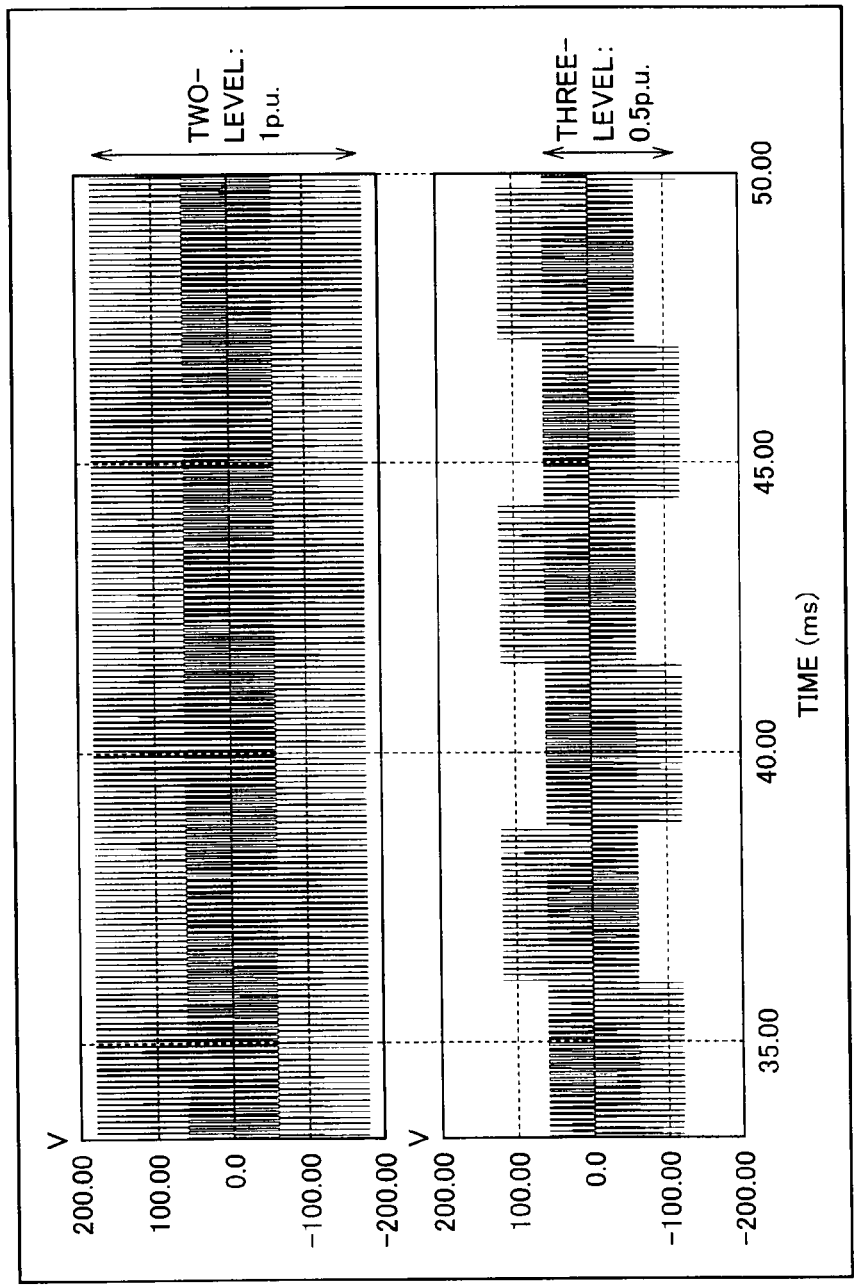
FIG. 14 shows the results of simulating a fluctuation in a potential to ground of a two-level inverter and a fluctuation in a potential to ground of a three-level inverter.

FIG. 14 shows the results of simulating a fluctuation in a potential to ground of a two-level inverter and a fluctuation in a potential to ground of a three-level inverter. In the simulations, a DC voltage inputted to the inverters was set to be 360V. Referring to FIG. 14, when a fluctuation of a potential to ground in the two-level inverter is 1 [p.u], a fluctuation of a potential to ground in the three-level inverter is 0.5 [p.u]. As shown in FIG. 14, in a three-level inverter, reduction in a fluctuation in a potential to ground can be achieved.

Further, according to the present embodiment, reduction in the loss of inverter 4 can be achieved. Specifically, the loss of inverter 4 is conduction loss (loss in conduction of each of IGBT elements and diodes) and switching loss of an IGBT element.

Figures 15, 16:
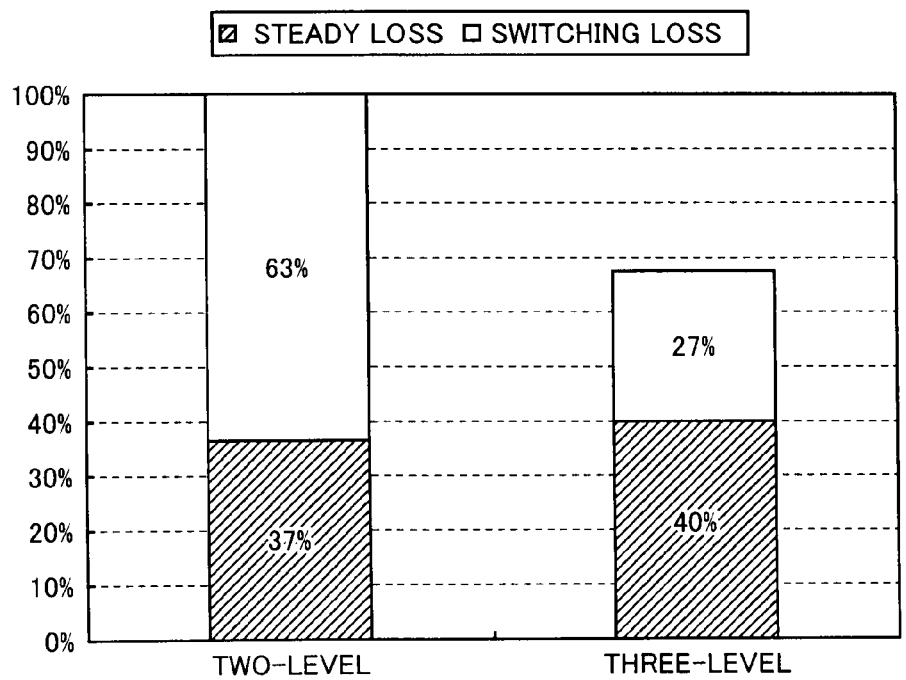
FIG. 15 shows the results of simulating losses of a two-level inverter and a three-level inverter.
FIG. 16 shows a breakdown of the losses of the two-level inverter and the three-level inverter.

FIG. 15 shows the results of simulating losses of a two-level inverter and a three-level inverter. FIG. 16 shows a breakdown of the losses of the two-level inverter and the three-level inverter. In these simulations, a DC input voltage was 600 V, a switching frequency was 10 kHz, an AC output voltage (line voltage) was 380 Vrms, and the size of a load was 275 kW. It is noted that the IGBT elements included in the two-level inverter were 1200V-600 A products, while the IGBT elements included in the three-level inverter were 600V-600 A products.

Referring to FIGS. 15 and 16, the total loss of the three-level inverter was 68% of the total loss of the two-level inverter. This is because of a reduced switching loss. As shown in FIG. 15, the three-level inverter had a smaller switching loss than that of the two-level inverter (43%). This is because in a three-level inverter, a voltage applied to one semiconductor switching element can be made smaller than that in a two-level inverter.

As shown in FIG. 16, in the two-level inverter, a switching loss accounted for a large proportion (63%) of the total loss. In a three-level inverter, this switching loss can be reduced substantially. Therefore, although a three-level inverter has an increased conduction loss than that of a two-level inverter, the total loss can be made smaller than that of a two-level inverter. Reducing an inverter loss can achieve enhanced operation efficiency of a power conversion device.

In the present embodiment, since converter 3 is also constituted of a three-level circuit, converter 3 can also provide the same effect as that by inverter 4. Specifically, downsizing of the reactor contained in the input filter can be achieved. A further downsizing and weight reduction of a power conversion device can thereby be realized. Further, since suppression of a fluctuation in a potential to ground can be achieved, reduction in the amount of noise generated by converter 3 can also be achieved. Still further, since reduction in loss of converter 3 can be achieved, enhanced operation efficiency of a power conversion device can be achieved. In addition to these effects, converter 3 and inverter 4 are allowed to use common components, and therefore, a lower cost of a power conversion device can be realized.

Figures 17, 18:
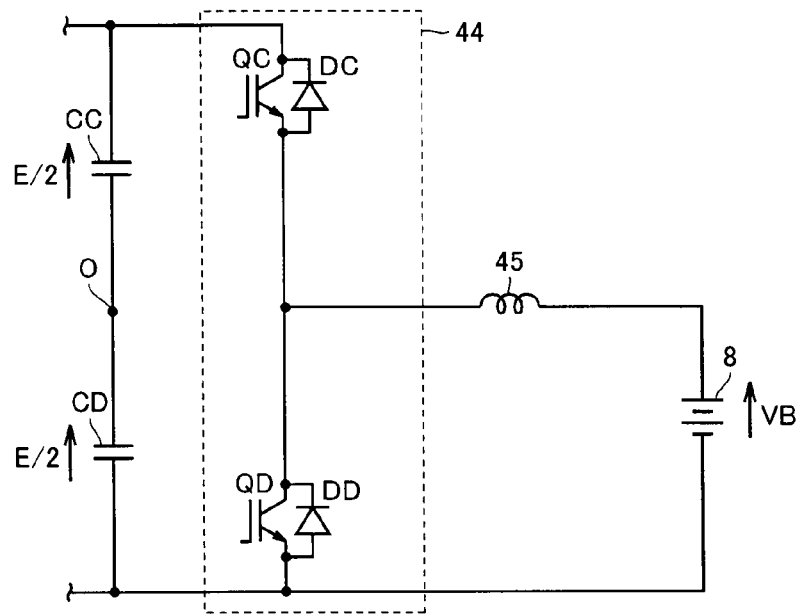
FIG. 17 shows a configuration of a semiconductor switch included in a conventional DC voltage converter.
FIG. 18 shows switching patterns of IGBT elements Q1D to Q4D and voltages applied to a reactor 22 of FIG. 3.

Further, DC voltage converter 7 has conventionally had a configuration in which two IGBT elements QC, QD are connected in series, as shown in a semiconductor switch 44 of FIG. 17. As shown in FIG. 3, in the present embodiment, four IGBT elements are connected in series to constitute a semiconductor switch, thereby reducing ripple components in current through reactor 22. In the case of the configuration in FIG. 17, a voltage of (E−VB) is applied to a reactor 45 when IGBT element QC is on and IGBT element QD is off, and a voltage of (−VB) is applied to reactor 45 when IGBT element QC is off and IGBT element QD is on. Accordingly, the reactor voltage difference due to switching is E. In contrast, in the configuration in FIG. 3, while a voltage of (−VB) is applied to reactor 22 when only IGBT elements Q2D, Q3D are turned on, and a voltage of (E−VB) is applied to reactor 22 when only IGBT elements Q1D, Q4D are turned on, there is another case where only IGBT elements Q1D, Q3D are turned on or only IGBT elements Q2D, Q4D are turned on. In this case, a voltage of E/2−VB is applied to reactor 22.

FIG. 18 shows switching patterns of IGBT elements Q1D to Q4D and voltages applied to reactor 22. It can be seen from FIG. 18 that the voltage which can be applied to reactor 22 by DC voltage converter 7 also has three levels. The configuration in FIG. 3 allows a reactor voltage difference due to switching to be E/2 and ripple components in current thorough reactor 22 can be made smaller. Inductance of reactor 22 can thereby be reduced achieving downsizing of reactor 22, and therefore, a further downsizing and weight reduction of a power conversion device can be realized.

In the present embodiment, a three-level circuit has been shown, however, it is only necessary for the circuit that constitutes the inverter, the converter and the DC voltage converter to be a circuit (a multi-level circuit) for conversion between a DC voltage and an AC voltage having at least three voltage values or a DC voltage. Therefore, a five-level circuit for conversion between a DC voltage and an AC voltage having at least five voltage values is applicable, for example, to the inverter.

Figure 19:
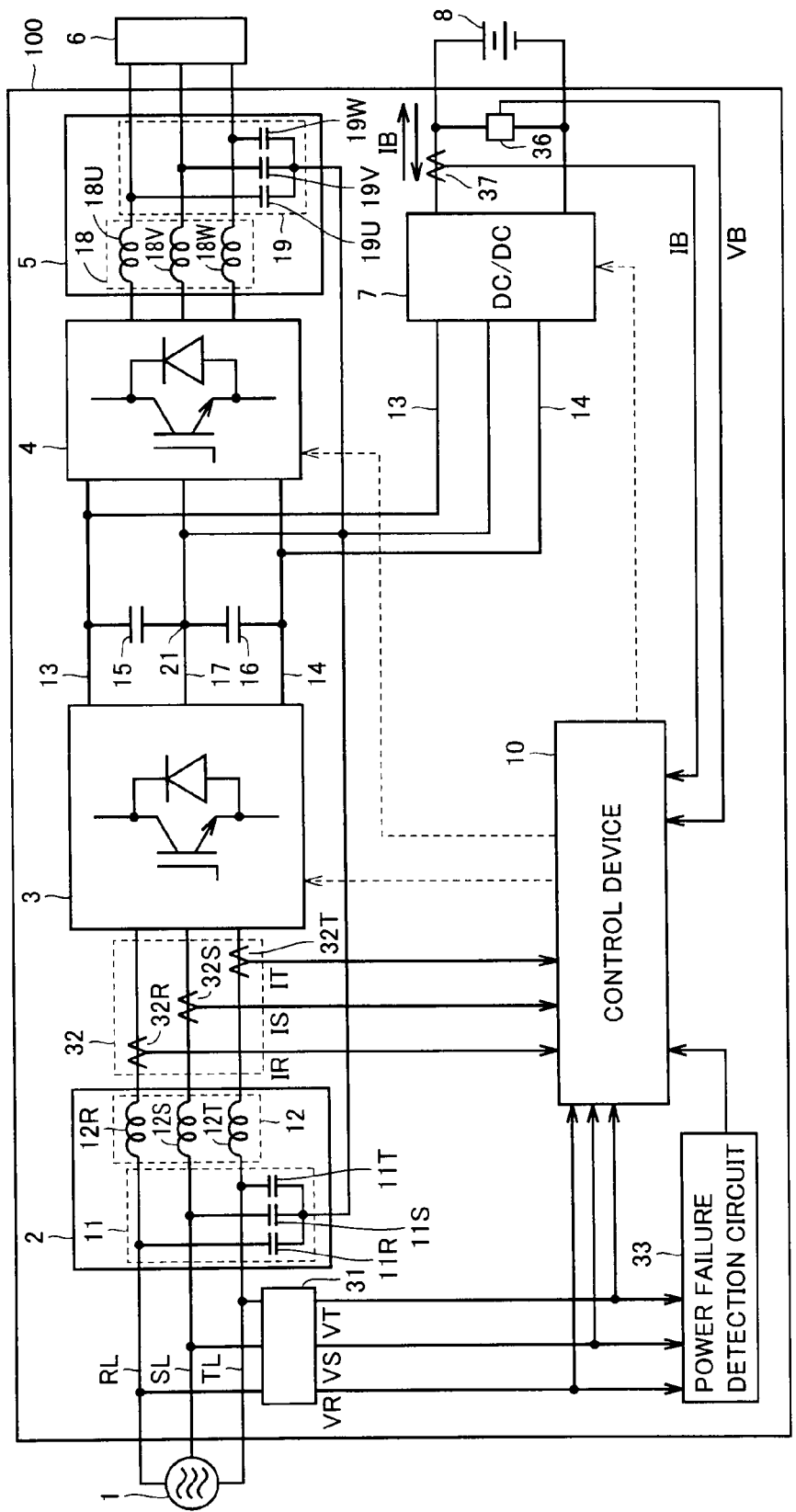
FIG. 19 shows a form of a power conversion device of the present invention applied to a three-phase, four-wire system.

In addition, in the present embodiment, an uninterruptible power supply device applicable to a three-phase three-wire system AC power supply and load has been shown, however, the present invention is also applicable to a three-phase four-wire system AC power supply and load. In the case of the three-phase four-wire system, as shown in FIG. 19, it is only necessary to connect a midpoint of capacitors 11 and 19 and neutral point 21 to each other. Further, the AC power supply and the AC load are not limited to those of three phases, and may be of a single phase. In this case, it is only necessary that two multi-level circuits are included in each of the converter and the inverter.

Further, in the present embodiment, a DC voltage converter is applied between the storage battery and the DC bus, however, the DC voltage converter can be eliminated as a matter of course when the storage battery can be selected within a rated operation range of the DC bus.

Still further, in the present embodiment, an example where the power conversion device according to the present invention is applied to the uninterruptible power supply device including the storage battery has been described; however, downsizing and weight reduction as well as suppression of a fluctuation in a potential to ground of a filter using a multi-level circuit is applicable to a power conversion device outputting AC power based on DC power, such as a solar power generation system, a fuel cell power generation system, or a secondary battery energy storage system.

Figure 20:
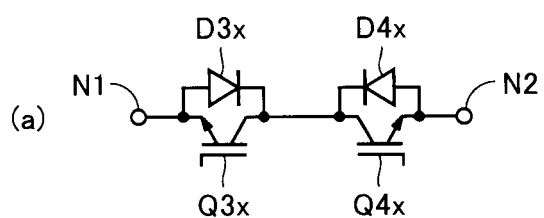
FIG. 20 shows modifications of the AC switch shown in FIG. 2.
Figure 20:
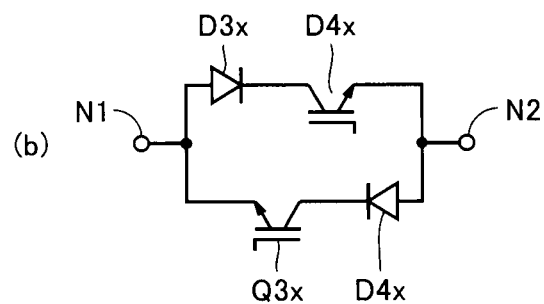
Figure 20:
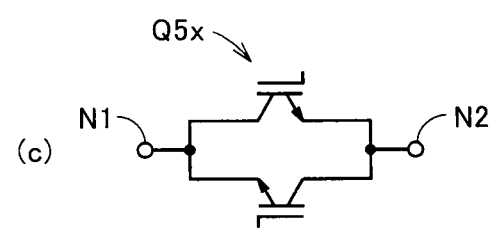

Yet further, in the present embodiment, as the AC switches (3RB, 3SB, 3TB, 4UB, 4VB, 4WB), an AC switch including two IGBT elements Q3$x$, Q4$x$ having emitters connected to each other and two diodes D3$x$, D4$x$ connected in anti-parallel to IGBT elements Q3$x$, Q4$x$, respectively is employed, however, a differently configured AC switch as shown in FIGS. 20($a$) to 20($c$) may be employed.

The AC switch in FIG. 20($a$) includes IGBT element Q3$x$ having an emitter connected to a node N1, IGBT element Q4$x$ having a collector connected to a collector of IGBT element Q3$x$ and an emitter connected to a node N2, and two diodes D3$x$, D4$x$ connected in anti-parallel to IGBT elements Q3$x$, Q4$x$, respectively. It is noted that node N1 is connected to a line of a corresponding phase (RL, SL, TL, UL, VL, WL), and node N2 is connected to neutral point 21.

The AC switch in FIG. 20($b$) includes diode D3$x$ having an anode connected to node N1, IGBT element Q4$x$ having the collector connected to a cathode of diode D3$x$ and having the emitter connected to node N2, IGBT element Q3$x$ having the emitter connected to node N1, and diode D4$x$ having a cathode connected to the collector of IGBT element Q3$x$ and having an anode connected to node N2. The AC switch in FIG. 20($c$) includes a reverse blocking IGBT element Q5$x$ connected between nodes N1 and N2.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power conversion device comprising:
a converter including a multi-level circuit configured to be capable of conversion between a DC voltage and an AC voltage varying between at least three voltage values, and converting DC power to AC power to supply the AC power to a load;
a filter including a reactor and a capacitor and removing harmonics generated by said converter;
a DC power supply generating DC power;
a DC positive bus and a DC negative bus for transmitting said DC power to said converter; and
first and second capacitors connected in series between said DC positive bus and said DC negative bus,
said multi-level circuit including:
first and second semiconductor switching elements connected in series between said DC positive bus and said DC negative bus;
first and second free-wheeling diodes connected in anti-parallel to said first and second semiconductor switching elements, respectively; and
an AC switch connected between a neutral point of said first and second capacitors and a connection point of said first and second semiconductor switching elements.

2. The power conversion device according to claim 1, wherein
said AC switch includes:
a first transistor having a collector connected to said neutral point;
a second transistor having an emitter connected to an emitter of said first transistor and having a collector connected to the connection point of said first and second semiconductor switching elements; and third and fourth diodes connected in anti-parallel to said first and second transistors, respectively.

3. The power conversion device according to claim 1, wherein
said AC switch includes:
a first transistor having an emitter connected to said neutral point;
a second transistor having a collector connected to a collector of said first transistor and having an emitter connected to the connection point of said first and second semiconductor switching elements; and
third and fourth diodes connected in anti-parallel to said first and second transistors, respectively.

4. The power conversion device according to claim 1, wherein
said AC switch includes:
a first transistor having an emitter connected to said neutral point;
a third diode having a cathode connected to a collector of said first transistor and having an anode connected to the connection point of said first and second semiconductor switching elements;
a fourth diode having an anode connected to said neutral point; and
a second transistor having a collector connected to a cathode of said fourth diode and having an emitter connected to the connection point of said first and second semiconductor switching elements.

5. The power conversion device according to claim 1, wherein
said AC switch includes a reverse blocking IGBT element connected between said neutral point and the connection point of said first and second semiconductor switching elements.

6. A power conversion device comprising:
a first converter including a first multi-level circuit configured to be capable of conversion between a DC voltage and an AC voltage varying between at least three voltage values, and converting DC power to AC power to supply the AC power to a load;
a filter including a reactor and a capacitor and removing harmonics generated by said first converter;
a second converter converting AC power from an AC power supply to DC power;
a DC power supply generating DC power;
a DC positive bus and a DC negative bus for transmitting DC power generated at said second converter and said DC power supply to said first converter; and
first and second capacitors connected in series between said DC positive bus and said DC negative bus,
said first multi-level circuit including:
first and second semiconductor switching elements connected in series between said DC positive bus and said DC negative bus;
first and second diodes connected in anti-parallel to said first and second semiconductor switching elements, respectively; and
an AC switch connected between a neutral point of said first and second capacitors and a connection point of said first and second semiconductor switching elements.

7. The power conversion device according to claim 6, wherein
said second converter includes a second multi-level circuit having the same configuration as said first multi-level circuit.

8. The power conversion device according to claim 6, wherein
said AC switch includes:
a first transistor having a collector connected to said neutral point;
a second transistor having an emitter connected to an emitter of said first transistor and having a collector connected to the connection point of said first and second semiconductor switching elements; and
third and fourth diodes connected in anti-parallel to said first and second transistors, respectively.

9. The power conversion device according to claim 6, wherein
said AC switch includes:
a first transistor having an emitter connected to said neutral point;
a second transistor having a collector connected to a collector of said first transistor and having an emitter connected to the connection point of said first and second semiconductor switching elements; and
third and fourth diodes connected in anti-parallel to said first and second transistors, respectively.

10. The power conversion device according to claim 6, wherein
said AC switch includes:
a first transistor having an emitter connected to said neutral point;
a third diode having a cathode connected to a collector of said first transistor and having an anode connected to the connection point of said first and second semiconductor switching elements;
a fourth diode having an anode connected to said neutral point; and
a second transistor having a collector connected to a cathode of said fourth diode and having an emitter connected to the connection point of said first and second semiconductor switching elements.

11. The power conversion device according to claim 6, wherein
said AC switch includes a reverse blocking IGBT element connected between said neutral point and the connection point of said first and second semiconductor switching elements.

12. A power conversion device comprising:
a first converter including a first multi-level circuit configured to be capable of conversion between a DC voltage and an AC voltage varying between at least three voltage values, and converting DC power to AC power to supply the AC power to a load;
a filter including a reactor and a capacitor and removing harmonics generated by said first converter;
a second converter converting AC power from an AC power supply to DC power;
a third converter converting a voltage value of power stored in a power storage device to generate DC power when power supply by said AC power supply is abnormal;
a DC positive bus and a DC negative bus for transmitting DC power generated at said second and third converters to said first converter; and
first and second capacitors connected in series between said DC positive bus and said DC negative bus,
said first multi-level circuit including:
first and second semiconductor switching elements connected in series between said DC positive bus and said DC negative bus;

first and second diodes connected in anti-parallel to said first and second semiconductor switching elements, respectively; and an AC switch connected between a neutral point of said first and second capacitors and a connection point of said first and second semiconductor switching elements.

13. The power conversion device according to claim 12, wherein said second converter includes a second multi-level circuit having the same configuration as said first multi-level circuit.

14. The power conversion device according to claim 12, wherein said third converter includes a third multi-level circuit configured to be capable of conversion between a DC voltage and an AC voltage varying between at least three voltage values.

15. The power conversion device according to claim 12, wherein said AC switch includes:

a first transistor having a collector connected to said neutral point;

a second transistor having an emitter connected to an emitter of said first transistor and having a collector connected to the connection point of said first and second semiconductor switching elements; and third and fourth diodes connected in anti-parallel to said first and second transistors, respectively.

16. The power conversion device according to claim 12, wherein said AC switch includes:

a first transistor having an emitter connected to said neutral point;

a second transistor having a collector connected to a collector of said first transistor and having an emitter connected to the connection point of said first and second semiconductor switching elements; and third and fourth diodes connected in anti-parallel to said first and second transistors, respectively.

17. The power conversion device according to claim 12, wherein said AC switch includes:

a first transistor having an emitter connected to said neutral point;

a third diode having a cathode connected to a collector of said first transistor and having an anode connected to the connection point of said first and second semiconductor switching elements;

a fourth diode having an anode connected to said neutral point; and a second transistor having a collector connected to a cathode of said fourth diode and having an emitter connected to the connection point of said first and second semiconductor switching elements.

18. The power conversion device according to claim 12, wherein said AC switch includes a reverse blocking IGBT element connected between said neutral point and the connection point of said first and second semiconductor switching elements.

* * * * *